May 23, 1967     A. W. SCHACH     3,320,869
AIR DISTRIBUTOR
Filed Sept. 26, 1966     2 Sheets-Sheet 1
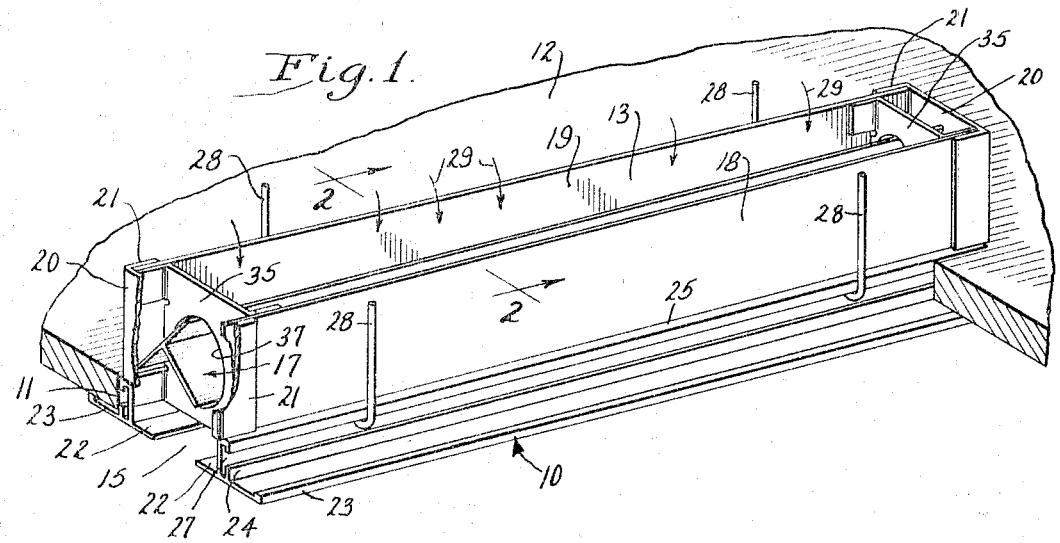
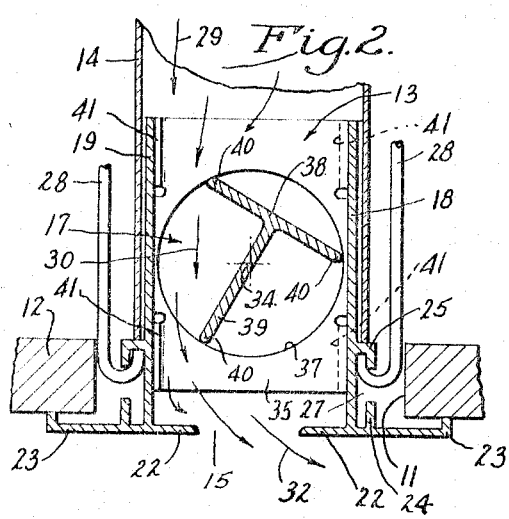
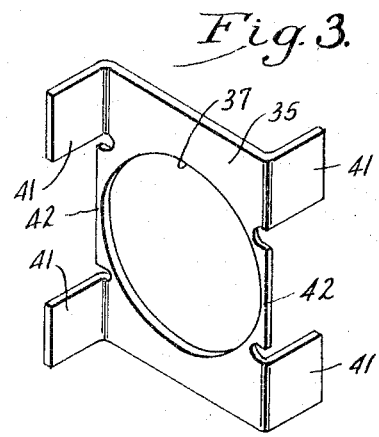
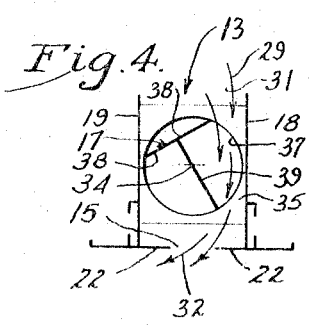
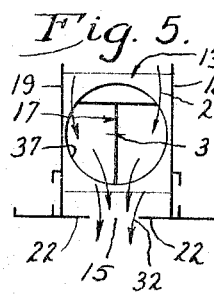
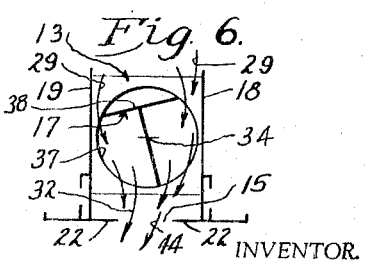
INVENTOR.
ALBERT W. SCHACH
BY Wolfe, Hubbard,
Voit & Osann
ATTORNEYS May 23, 1967 A. W. SCHACH 3,320,869
AIR DISTRIBUTOR
Filed Sept. 26, 1966 2 Sheets-Sheet 2
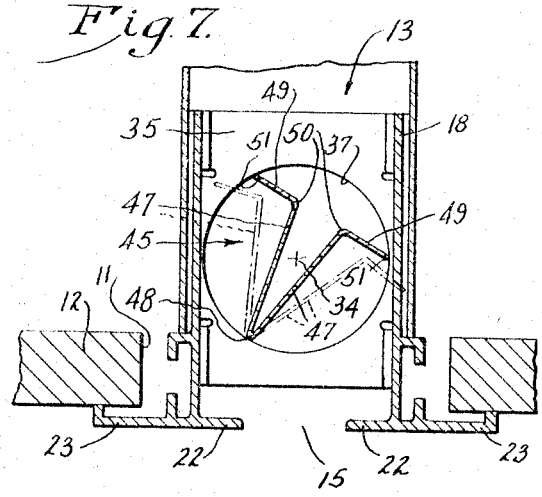
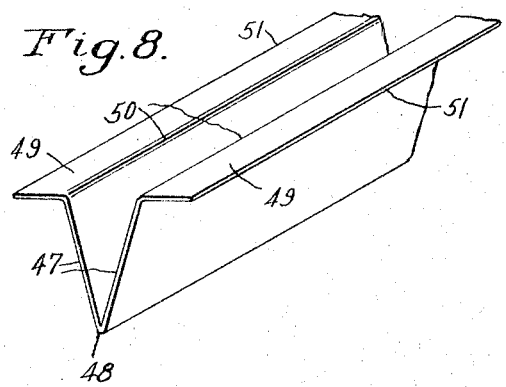
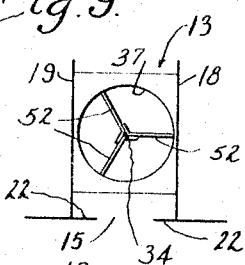
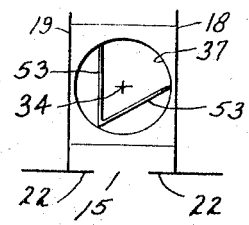
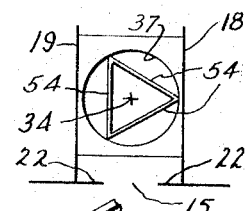
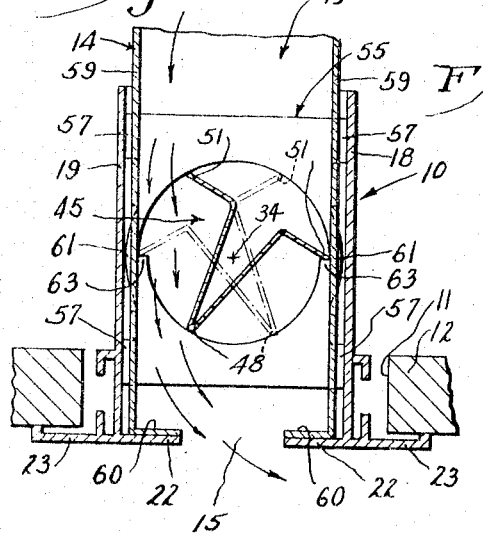
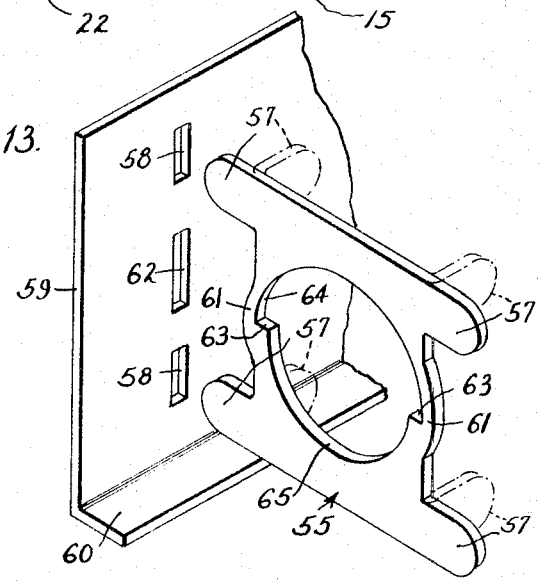
INVENTOR.
ALBERT W. SCHACH
BY Wolfe, Hubbard,
Voit & Osann
ATTORNEYS United States Patent Office 3,320,869
Patented May 23, 1967

3,320,869
AIR DISTRIBUTOR
Albert W. Schach, Rockford, Ill., assignor to Barber-Colman Company, Rockford, Ill., a corporation of Illinois
Filed Sept. 26, 1966, Ser. No. 582,032
13 Claims. (Cl. 98—40)

This invention relates to air distributors of the type in which air is discharged from the supply passage into the space to be conditioned through an elongated slot, and the direction and pattern of the air stream passing through the discharge slot is determined by the position of an adjustable vane assembly forming a deflector in the passage overlying the slot.

The general object of the present invention is to simplify the construction, installation and adjustment of the vane assembly in a distributor of the foregoing character.

A more detailed object is to control the discharge pattern with an elongated one-piece vane assembly of simple construction supported in a novel and inexpensive manner on the distributor for rotation about its longitudinal axis, and shaped to divert the air selectively toward and along one side or the other of the passage according to the angular position of the assembly about its axis.

A further object is to form a flow-controlling vane assembly with a plurality of elongated flat vanes secured together for rotation as a unit about the axis of the assembly.

Still another object is to mount such an assembly for rotation in the distributor in an extremely simply manner without pintles, hinge pins or the like.

Another object is to hold the vane assembly positively in each selected angular position with spring-applied frictional resistance obtained from the assembly itself.

The invention also resides in the novel manner of forming and supporting an elongated vane assembly rotatable as a unit about a longitudinal axis and operable in different angular positions to deflect air in opposite directions around the assembly.

Other objects and advantages of the invention will become apparent from the following detailed description taken in connection with the accompanying drawings, in which FIGURE 1 is a fragmentary perspective view of an air distributor embodying the novel features of the present invention, shown mounted in a room ceiling.

FIG. 2 is an enlarged fragmentary cross-sectional view taken along the line 2—2 of FIG. 1.

FIG. 3 is an enlarged perspective view of a support for the vane assembly.

FIGS. 4–6 are schematic sectional views similar to FIG. 2 illustrating different positions of the vane assembly.

FIG. 7 is a sectional view similar to FIG. 2 showing an alternate form of the invention.

FIG. 8 is an enlarged perspective view of the vane assembly of FIG. 7.

FIGS. 9–11 are schematic views similar to FIG. 4 showing further alternate forms of the invention.

FIG. 12 is a fragmentary cross-sectional view similar to FIG. 7 showing a modified form of the support and its mounting in the distributor.

FIG. 13 is a fragmentary perspective view of the modified form of FIG. 12.

As shown in the drawings for purposes of illustration, the invention is embodied in a slot or strip type air distributor 10 comprising an elongated housing set into a hole 11 in the ceiling 12 of a room and defining an air passage 13 through which conditioned air from a supply duct 14 (FIG. 2) is delivered to an elongated slot 15 in the underside of the housing for discharging a stream of air into the room. In such distributors, the direction of discharge of the air stream is controlled by a vane assembly 17 in the housing overlying the slot and adjustably positioned within the air passage to vary the path of approach of the air toward the slot and the angle of discharge into the room.

The housing 10 defining the passage 13 herein comprises two elongated sidewalls 18 and 19 disposed in parallel vertical planes and two end walls 20 closing the ends of the housing, each of the end walls having two flanges 21 bent around the outer sides of the sidewalls and secured thereto as by welding. Formed on the lower edge of each sidewall, preferably perpendicular thereto, is an elongated strip with side edge portions 22 and 23 extending both inwardly and outwardly from the wall. The outwardly extending portions 23 form flanges overlapping the ceiling 12 on both sides of the distributor to mask the hole 11 and present a neat appearance, and the inwardly extending portions 22 terminate in spaced parallel edges defining the discharge slot 15 which is centered on the lower end of the passage 13. Each sidewall and the associated flanges may be formed integrally as a metal extrusion which preferably includes longitudinal ribs 24 and 25 extending along the lower outer portion of the sidewall and defining a T-groove 27 for use in suspending the distributor with wires 28.

As in prior strip distributors, the vane assembly 17 cooperates with the flanges 22 in bending the air stream in one direction or the other as the air passes through the discharge slot 15. For this purpose, the air of the supply stream above the deflector, indicated by the arrows 29, is bent laterally in one direction toward one sidewall 18, 19 or the other in passing the deflector, as indicated at 30 and 31 in FIGS. 2 and 4, whereby a substantial portion of the air flows along that wall and impinges against the flange 22 thereon. The flange, in turn, deflects the impinging air laterally in the opposite direction across the discharge slot to merge with the air flowing more directly toward the slot. The resulting discharge stream passes through the slot at an angle with the direction of the supply flow as indicated by the arrows 32 and 33. By adjusting the deflecting vanes, the discharged stream may be inclined relatively sharply in either lateral direction. In addition, the angle of discharge in each direction may be changed, and the vane assembly may be adjusted for equal flows along the two sidewalls of the passage for a discharge stream that flows generally straight down from the slot.

In accordance with the present invention, the vanes of the assembly 17 are joined together to form an elongated deflector rotatable as a unit about a longitudinal axis 34 over the discharge slot 15, and are arranged in a novel manner to deflect the oncoming air along the opposite sides of the passage in different angular positions of the assembly and also to form peripheral bearing surfaces for journaling the assembly in simple and inexpensive supporting plates 35 having holes 37 through which the entire assembly extends. Accordingly, the assembly is relatively inexpensive to fabricate and install and, at the same time, effectively varies the discharge angle of the distributor in response to a simple rotary adjustment.

In the embodiment of the invention shown in FIGS. 1–6, the vane assembly 17 is a metal extrusion of T-shaped transverse cross-section formed by two vanes 38 and 39 joined together at right angles with each other. The three longitudinal edges 40 of the vanes are spaced equal distances from the axis of rotation of the assembly and, of course, are angularly spaced apart about the axis. With this arrangement, the vane assembly may be journaled for rotation in the distributor housing simply by telescoping the assembly through the alined circular holes 37 in the support plates 35 which are spaced apart within the air passage, longitudinally of the vanes, and extend between the two sidewalls 18 and 19. Herein, the plates are perpendicular to the sidewalls and, as shown most clearly in FIG. 3, are formed with tabs 41 bent at right angles with the plates. These tabs lie against the sidewalls and are suitably fastened thereto, for example, by welding, to secure the plates to the housing. The ends of the vane assembly are close to the end walls 20, which are fastened to the sidewalls after the vane assembly is in place.

To cooperate with the vane edges 40 in journaling the assembly 17 in the distributor housing, the holes 37 are formed with radii equal to the spacing of the edges from the axis 34 of the assembly. Thus, the vane edges bear against the wall of each hole and provide three-point rotary support for the assembly. The width of the support plates is only slightly greater than the diameter of the holes to leave narrow strips at 42 (FIG. 3) between the holes and the sidewalls.

When the vane assembly 17 is in the position shown in FIG. 2 with the vane 38 inclined downwardly to the right and its right edge close to the right sidewall 18 of the housing, virtually all air flow around the right side is blocked. Accordingly, the oncoming air stream 29 is deflected to the left at 30 to flow along the left sidewall 19, and then is inclined to the right at 32 through the discharge slot 15. To incline the stream sharply to the left, the assembly is turned counterclockwise to the position shown in FIG. 4 in which the left edge of the blocking vane 38 is adjacent the left sidewall to deflect the air stream to the right and along the right sidewall at 31 to impinge against the right flange 22 and issue to the left as indicated at 33. As the blocking vane 38 is moved from one side to the other, it will be seen that the free edge 40 of the other vane 38 swings laterally in the opposite direction toward the sidewall along which the air stream is to be deflected. This vane thus serves the purpose of holding the stream close to the sidewall for optimum lateral deflection by the flanges 22.

When the vane assembly 17 is positioned as shown in FIG. 5, the blocking vane 38 is centered between the sidewalls 18, 19 and thus defines flow passages of equal width along both sides. Under these circumstances, the two flows merge above the discharge slot 15 to issue generally straight down into the room. In the position shown in FIG. 6, a minor flow is permitted around one side of the vane assembly to merge with the major flow around the other side for a less sharply inclined discharge path at 44 than those obtained in the positions shown in FIGS. 2 and 4.

A preferred embodiment of the invention is shown in FIGS. 7 and 8 in which the vane assembly 45 is generally T-shaped but comprises a single strip of sheet metal folded longitudinally into a V-shaped section, formed by two strips 47 integrally joined by a longitudinal bend 48, and two separated wings or flanges 49 projecting laterally from the free edges of the V. The flanges are joined to the V by bends 50 and disposed in a common plane to form the wide blocking side of the vane assembly corresponding to the vane 38. In operation, this assembly functions in the same general manner as the embodiment of FIGS. 1–6. It has the additional advantage, however, of being composed of resiliently flexible sheet material and is formed, initially, with the V of the two strips 47 spread to a slight extent to increase the width at the edges 51 of the flanges 49, as indicated in broken lines in FIG. 7. Then the assembly is compressed, slipped into the holes 37 in the support plates 35, and released to expand radially into snug frictional engagement with the walls of the holes. This insures that the assembly is held tightly in the distributor and remains in a selected angular position.

Other cross-sectional shapes are indicated schematically in FIGS. 9–11 wherein it will be seen that the assembly may be formed by three vanes 52 (FIG. 9) joined together in edge-to-edge relation at the axis 34 in a Y shape, by two sheet metal vanes 53 (FIG. 10) forming a V which may be made oversize and held in the supports with a friction fit, or by three vanes 54 (FIG. 11) in a hollow triangular shape. All of these forms function in the same general manner as the T-shaped embodiment of FIGS. 1–6.

An improved support 55 for a rotary vane assembly of any of the types previously described is shown in FIGS. 12 and 13 in combination with the preferred assembly 45 of FIGS. 7 and 8. In this instance, each of the side edges of the support plate is formed with two tabs 57 projecting laterally outwardly in the plane of the plate (see FIG. 13) through two spaced slots 58 in the sidewalls of the passage 13 which herein are formed by two sheets 59 lying along the sidewalls 18 and 19 of the housing 10 and having inturned flanges 60 resting on the housing flanges 22. Outside the side sheets, the tabs are bent at right angles with the support plate as shown in broken lines in FIG. 13 to mount the plate securely in place in the housing while tying the side sheets together. With this type of mounting, the side sheets, support plates and vane assembly may be installed in the housing from the top after the latter has been mounted in the ceiling, the supply duct being joined to the side sheets in any suitable manner.

Formed on both sides of the support plate 55 between the mounting tabs are two lateral extensions 61 of the plate which project outwardly into alined slots 62 in the side sheets between the mounting slots 58. The purpose of these extensions is to increase the width of the plate, level with the central portion of the bearing hole where the hole is widest, to a width greater than the width of the passage 13. With this arrangement, the hole may be made as wide as the passage width so that the edges 51 of the blocking side of the vane assembly can engage the sidewalls for complete closing of the selected side portion of the passage. This prevents any significant leakage between the vane assembly and the sidewalls, which are generally tangent to the bearing hole. Preferably, the extensions 61 are formed with arcuate outer edges that are concentric with the walls of the bearing holes.

Another feature of the modified support 55 is the provision of stops 63 on the plate for blocking rotation of the vane assembly 45 past the two extreme positions shown in full and in broken lines in FIG. 12. To form these stops, the arcuate wall 64 forming the upper half of the bearing hole is formed with a radius somewhat longer than the radius of the concentric arcuate wall 65 forming the lower half of the hole, and the two halves are joined by upwardly facing radial shoulders constituting the stops. In each direction of rotation of the vane assembly from a centered position, one of the edges 51 engages a stop shoulder to limit such turning. This indicates when the assembly has reached the desired position closing the selected side portion of the passage, and thus facilitates the adjustment of the distributor in service use. With this form, it will be seen that the spacing of the edges 51 from the axis 34 of rotation is somewhat greater than the spacing of the lower bend 48 therefrom. While the stops may be located in different angular positions around the bearing hole, the preferred location is at the point where the side sheets 59 are tangent to the semi-circular upper wall 64.

From the foregoing, it will be seen that the present invention provides a simple vane assembly in which all of the parts may be joined rigidly together to turn as a unit about the longitudinal axis of the assembly while, at the same time, permitting effective variation of the discharge pattern by a simple rotary adjustment of the assembly as a unit. The vane assembly of each embodiment of the invention has a relatively wide blocking side swingable back and forth across the passage during rotation of the assembly, and also tapers in effective cross-sectional width toward the slot. Moreover, the vanes of each assembly extend through the supports 35 and form peripheral bearing surfaces cooperating with the walls of the holes 37 to journal the assembly in the air passage 13.

I claim as my invention:

1. An air distributor having, in combination, spaced sidewalls forming the sides of an air passage having an elongated outlet end, spaced flanges at said outlet end extending toward each other in a common plane and defining an elongated slot for the discharge of air from said passage, an elongated vane assembly overlying said slot within said passage and rotatable in said passage about a longitudinal axis generally parallel to the slot, said assembly comprising a plurality of elongated flat vanes joined together to form a relatively wide side of said assembly facing away from said slot and a narrower side adjacent said slot, said wide side being narrower than the width of said passage to define flow passages along both of said sidewalls when centered in said passage, said vanes having angularly spaced longitudinal edges parallel to said axis and each radially spaced a predetermined distance from the axis, and two support plates spaced apart longitudinally of said vanes and secured to said sidewalls, said support plates having alined holes with arcuate walls concentric with and encircling said vanes and sized to bear on said edges whereby said support plates journal the assembly in said passage for rotation about said axis to rock said wide side selectively toward each of said sidewalls thereby to vary the flow pattern toward and through said slot.

2. An air distributor as defined in claim 1 in which said assembly comprises two elongated vanes joined together in a unit of T-shaped transverse cross-section.

3. An air distributor as defined in claim 1 in which said assembly comprises an elongated portion of V-shaped transverse cross-section, and laterally projecting flanges on the free edges of the "V" disposed generally in a common plane to form said relatively wide side.

4. An air distributor as defined in claim 3 in which said assembly is a single strip of resilient flexible material and is assembled in said holes in radially compressed condition to apply frictional resistance to turning within the holes.

5. An air distributor as defined in claim 1 in which said assembly comprises three vanes joined together in edge-to-edge relation generally along said axis in a unit of Y-shaped transverse cross-section.

6. An air distributor as defined in claim 1 in which said assembly comprises three elongated vanes joined together in a unit of triangular cross-section.

7. An air distributor having, in combination, a housing defining an air passage of predetermined width and having an outlet end formed with a slot for discharging air from said passage, an elongated deflector overlying said slot in said passage and rotatable about an axis generally parallel to said slot, said deflector comprising a single strip of sheet material having longitudinal bends forming a V-shaped portion with flanges projecting laterally away from the free edge portions of the "V" generally in a common plane, two support plates spaced apart longitudinally of said deflector and mounted in said housing, said plates having alined holes defined by arcuate walls through which said deflector extends, and said flanges and said V-shaped portion having three angularly spaced longitudinal edges bearing against said walls to journal said deflector in said housing.

8. An air distributor as defined in claim 7 in which said sheet material is resiliently flexible, and said deflector is held by said plates under radial compression for frictional resistance to turning of the deflector in said holes.

9. An air distributor as defined in claim 7 in which each of said holes is defined by two concentric part-circular walls formed with different radii and joined together by shoulders forming stops for limiting rotation of said deflector in two angularly spaced positions determined by the angular spacing of said stops.

10. An air distributor having, in combination, spaced sidewalls defining the sides of an air passage having an elongated outlet end, means at said outlet end reducing the width of said passage and forming an elongated discharge slot between said sidewalls, an elongated vane assembly overlying said discharge slot within said passage and rotatable about a longitudinal axis generally parallel to the slot, support plates spaced apart within said passage longitudinally of said vane assembly and having alined holes through which said assembly extends, said assembly comprising a plurality of elongated vanes having outer longitudinal edges each spaced radially from said axis, and said holes having arcuate walls engaging said edges and mounting said assembly for rotation in said passage between different angular positions.

11. An air distributor as defined in claim 10 in which said sidewalls are formed with slots alined with said support plates on opposite sides thereof, and the plates are wider than the width of said passage at said slots thereby to project into the latter, said holes extending fully across said passage to permit the positioning of said vane edges against said sidewalls.

12. An air distributor as defined in claim 10 in which each of said holes is defined by two concentric arcuate walls formed with different radii and connected by shoulders forming stops for limiting rotation of said vane assembly in two angularly spaced positions, one of said longitudinal edges being closely adjacent a sidewall in each of said positions.

13. An air distributor having, in combination, elongated generally parallel sidewalls forming the sides of an air passage having an elongated outlet end, means at said outlet end reducing the width of said passage and defining an elongated discharge slot between said sidewalls, an elongated vane assembly overlying said discharge slot within said passage generally parallel to the slot and comprising a plurality of elongated vanes joined together for movement as a unit and having side edges extending longitudinally of said assembly, and means supporting said assembly for selective rotation about its longitudinal axis, said assembly having a relatively wide blocking side facing away from said slot and tapering in effective cross-sectional width toward the slot, said blocking side being spaced from both of said sidewalls in one angular position of the assembly and swinging into alternate blocking positions close to the respective sidewalls as the assembly is rotated in opposite directions from said one position thereby to deflect air alternately along opposite sides of said passage to vary the discharge through said slot.

References Cited by the Examiner

UNITED STATES PATENTS 3,099,949   8/1963   Davidson _____ 98—40
3,260,188   7/1966   Person _____ 98—40

ROBERT A. O'LEARY, *Primary Examiner.*

W. E. WAYNER, *Assistant Examiner.*